(12) United States Patent
Kumar et al.

(10) Patent No.: US 8,955,133 B2
(45) Date of Patent: Feb. 10, 2015

(54) APPLYING ANTIMALWARE LOGIC WITHOUT REVEALING THE ANTIMALWARE LOGIC TO ADVERSARIES

(75) Inventors: Ajith Kumar, Seattle, WA (US); Timothy Jon Fraser, Bethesda, MD (US); Adrian M. Marinescu, Sammamish, WA (US); Marc E. Seinfeld, Fort Lauderdale, FL (US); Jack Wilson Stokes, III, North Bend, WA (US); Anil Francis Thomas, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 437 days.

(21) Appl. No.: 13/156,726

(22) Filed: Jun. 9, 2011

(65) Prior Publication Data

US 2012/0317644 A1 Dec. 13, 2012

(51) Int. Cl.
*G06F 21/00* (2013.01)
*G06F 21/55* (2013.01)
*G06F 21/56* (2013.01)

(52) U.S. Cl.
CPC ............ *G06F 21/552* (2013.01); *G06F 21/566* (2013.01)
USPC .............................................. 726/24; 723/23

(58) Field of Classification Search
USPC ....................................................... 726/23, 24
See application file for complete search history.

(56) References Cited

U.S. PATENT DOCUMENTS

| 7,640,583 | B1 | 12/2009 | Marinescu et al. | |
|---|---|---|---|---|
| 8,056,136 | B1 * | 11/2011 | Zaitsev | 726/24 |
| 2003/0177187 | A1 | 9/2003 | Levine et al. | |
| 2006/0259967 | A1 | 11/2006 | Thomas et al. | |
| 2007/0180529 | A1 * | 8/2007 | Costea et al. | 726/24 |
| 2009/0222920 | A1 * | 9/2009 | Chow et al. | 726/23 |
| 2010/0077481 | A1 | 3/2010 | Polyakov et al. | |

OTHER PUBLICATIONS

Cook, et al., "Remotely Keyed Cryptographics Secure Remote Display Access Using (Mostly) Untrusted Hardware", Retrieved at <<http://citeseerx.ist.psu.edu/viewdoc/download?doi=10.1.1.130.951&rep=rep1&type=pdf>>, Dec. 2004, pp. 21.

"Forefront Client Security SHA-SHV Deployment Guide", Retrieved at <<http://technet.microsoft.com/en-us/library/ff716603.aspx, May 27, 2010, pp. 26.

"Microsoft Transaction Server Architecture", Retrieved at <<http://www.ctbconsulting.conn/PDF%20Files/mts.pdf>>, Feb. 19, 2009, pp. 12.

* cited by examiner

*Primary Examiner* — Jeffrey Pwu
*Assistant Examiner* — Thong Truong
(74) *Attorney, Agent, or Firm* — Timothy Churna; Kate Drakos; Micky Minhas (57) ABSTRACT

The subject disclosure is directed towards a technology by which antimalware detection logic is maintained and operated at a backend service, with which a customer frontend machine communicates (queries) for purposes of malware detection. In this way, some antimalware techniques are maintained at the backend service rather than revealed to antimalware authors. The backend antimalware detection logic may be based upon feature selection, and may be updated rapidly, in a manner that is faster than malware authors can track. Noise may be added to the results to make it difficult for malware authors to deduce the logic behind the results. The backend may return results indicating malware or not malware, or return inconclusive results. The backend service may also detect probing-related queries that are part of an attempt to deduce the unrevealed antimalware detection logic, with noisy results returned in response and/or other actions taken to foil the attempt.

20 Claims, 5 Drawing Sheets

File belongs to the
Rbot family

|   | F | T |
|---|---|---|
| F | A | B |
| T | C | D |

Contains string XYZ (row label)

APPLYING ANTIMALWARE LOGIC WITHOUT REVEALING THE ANTIMALWARE LOGIC TO ADVERSARIES

BACKGROUND

Via the Internet, individuals and organizations with malicious intent author and distribute software that damages computer systems and/or is used to steal the personal information of users (including individual users and entities such as companies). Such malicious software, or malware, often exploits code vulnerabilities and/or gets installed onto users' computer systems by tricking users into taking some action.

To protect against malware, contemporary antimalware software products use a variety of mechanisms to catch and quarantine malware. Contemporary antimalware technology has led to a cycle in which the antimalware vendors improve their products to provide protection against the latest malware, and the malware authors respond with improved malware that defeats these improvements, forcing antimalware vendors to continue the cycle.

Malware authors have one advantage, however, in that antimalware vendors are able to reverse engineer the operation of an antimalware engine given enough resources/time, and/or tweak their techniques versus the latest engine using "black-box" probing until their next generation of malware is able to defeat it. This occurs because antimalware vendors encode their techniques in the software delivered to customers and thus (unavoidably) to malware authors. The antimalware software cannot effectively conceal any techniques from the malware authors, and thus once revealed and defeated, the antimalware vendors have to produce a software release or update with changed techniques, (typically a signature update).

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a backend service receives and processes malware-related queries and associated data from a frontend client, in which the backend service uses updateable detection logic that is not revealed outside of the backend service. The processing determines whether the data associated with the malware-related query corresponds to detected malware, and the backend service returns a result in response to the query indicating whether the data associated with the malware-related query corresponds to detected malware.

The updateable detection logic may be updated based upon one or more updating criteria, such as time, number of queries processed, new information and/or the like. For example, the updateable detection logic may include feature-based classifiers (e.g., per families of malware) and telemetry and file-based classifiers, each trained with different data, with updating occurring by selecting among different classifiers for each family. A frontend client may extract the features and send feature data with the malware-related query to the backend service. The classifiers may include those that process the telemetry data sent to the backend system, and file-based classifiers that evaluate unknown files to predict if they are malicious.

In one aspect, a noise component may provide noise that changes the malware detection result to indicate that the data associated with the malware-related query does not correspond to detected malware, when the processing determined that the malware-related query does correspond to detected malware. This may be based on the query having been detected by the backend system as part of a probing attempt by a malware author to deduce the updateable detection logic by sending probing queries. Other actions may be taken for probing-related queries, e.g., to set up the program code for analysis to determine what the probing malware author is working on.

In one aspect, the backend service configured with the malware detection logic includes an unpredictability mechanism configured to operate to keep antimalware techniques in the malware detection logic from being deduced based upon the returned results. The unpredictability mechanism may operate to update the malware detection logic, and/or to vary at least one malware detected (or not detected) result that is returned in response to a corresponding client query. The unpredictability mechanism may operate to determine when a query is part of a probe attempt, so as to take action with respect to any such query.

In one aspect, a backend service receives a query and first associated data. The backend service processes the associated data and detects that the data corresponds to malware, and returns a response to the query including a result indicating that malware was detected. The backend service takes an action that is capable of providing a different result if given another query with similar (e.g., the same or substantively the same) associated data. Upon receiving another query with similar associated data at the backend service, the backend service returns a response to the other query including a result indicating that malware was not detected. The action taken may be to update the malware detection logic between processing the associated data and processing the similar associated data, or to apply a noise component that changes the result to a different result, e.g., if the other query is determined to be part of probing attempt.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards maintaining and operating antimalware logic and corresponding detection techniques on a remote backend service, with which a customer frontend machine communicates (queries) for purposes of malware detection. In this way, rather than revealing antimalware techniques by encoding them in the software shipped to customers, at least some of the techniques are maintained at the backend service. Note that as used herein, the term "malware" includes any piece of code for which it is desired to detect/block/remediate, including conventional malware as well as other potentially unwanted software code such as spyware/adware.

Further, the backend logic that implements these techniques may be updated rapidly, such as continuously, in a manner that is faster than malware authors can track. Noise may be added to the results to make it difficult for malware authors to deduce the logic behind the results. For example, the backend processing makes it difficult to study the antimalware techniques unless a relatively large number of probing queries is made, however such a large number of incoming probing queries may be observed as a probing attempt, with noisy (unpredictable) results returned. As a result, malware authors attempting to examine the backend logic may be identified as such and foiled.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and/or protection against malware in general.

Figure 1:
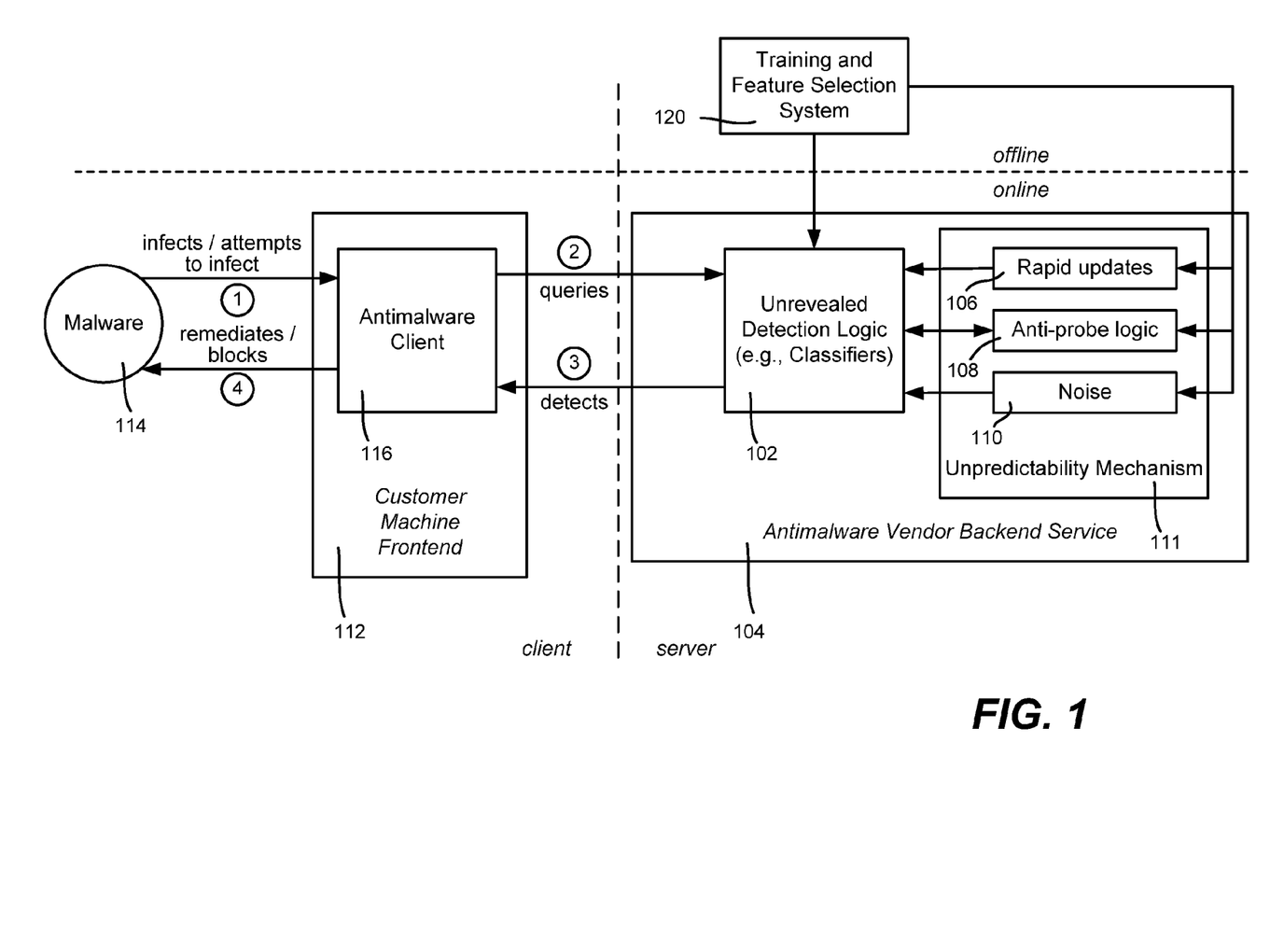
FIG. 1 is a block diagram representing example components for detecting malware using unrevealed detection logic in a backend service.

FIG. 1 is a generalized block diagram showing example components for detecting malware, in which at least part of the backend malware detection logic 102 is maintained at a backend service 104 (e.g., including one or more servers) and thus not revealed to malware authors. In addition to not revealing the techniques encoded in the backend malware detection logic 102, as described below the backend malware detection logic 102 may be rapidly updated (block 106). Further, anti-probe logic 108 may be employed, such as to add noise 110 to results that are very likely queries that are probing to determine the techniques of the backend malware detection logic 102. As will be understood, each of the components 106, 108 and 110, whether taken alone or in any combination, may be considered part of an unpredictability mechanism 111 that operates to keep the antimalware techniques in the backend malware detection logic 102 from being deduced based upon the returned results.

When potential malware is received at the customer machine front-end 112, the potential malware is processed before being allowed to run, so as to detect whether the potential malware is actual malware 114. If the potential malware is actual malware 114, as in the example of FIG. 1, the malware 114 will attempt to infect the customer machine front-end 112, as represented in FIG. 1 by circled numeral one (1).

In the implementation represented in FIG. 1, an antimalware client component 116 on the customer machine frontend 112 processes the malware 114 before the malware 114 is able to infect the machine. As part of this processing, the antimalware client component 116 is configured to query the antimalware vendor backend service 104 (corresponding to circled numeral two (2) in FIG. 1). Note that the antimalware client component 116 may perform some of its own malware detection, and thus may sometimes detect malware without needing to query the backend service 104; however for purposes of explanation, in the example of FIG. 1 the antimalware client component 116 queries the backend service 104. Thus, in this example, the antimalware client component 116 does not detect the malware 114, or alternatively, determines that the file was potentially malicious, and thus the query to the backend service 104 is made.

Further, note that the backend malware detection logic 102 and related components may be a superset of the logic available to clients; for example, the backend malware detection logic 102 can use larger resource limits, more signatures, more in-depth processing, and so forth. Also, signatures that are of an outdated threat may be moved to the backend, to keep the frontend more efficient, e.g., with scanning more limited, such as for signatures corresponding to more current threats.

In this example, the backend service 104 via the unrevealed backend malware detection logic 102 detects the malware 114 and returns information (corresponding to circled numeral three (3) in FIG. 1) to the antimalware client component 116 that indicates that malware was detected. Further, when malware is detected, the backend service 104 may provide the antimalware client component 116 with information (e.g., signature data) needed to remediate the problem. In this way, the antimalware client component 116 may take remedial action (corresponding to circled numeral four (4) in FIG. 1), such as to clean delete or quarantine the file containing the malware 114. Note that the operations represented by circled numerals 1-3 occur in real-time, within the context of a traditional antimalware scan.

In one implementation, rather than send the potential malware file to the antimalware vendor backend service, antimalware clients are configured to send information comprising characteristics and features of potential malware to the backend service; (although the client may send the file if deemed suspicious, and/or the backend may request the full file, such as for executables that have certain features and/or characteristics). More particularly, features and characteristics may be extracted from the file data by the antimalware client component 116, sent to the backend service 104, (e.g., in an xml report), and processed at the backend malware detection logic 102. To this end, the backend malware detection logic 102 includes one or more trained telemetry report classifiers that determine, in part, whether the features and characteristics are indicative of malware, or more specifically (in one implementation) a particular family of malware.

In one implementation of the telemetry classifier, a multi-class classifier (e.g., logistic regression, naïve Bayes, support vector machine, neural network, boosted decision tree, other boosted algorithms, ensemble classifiers, hierarchical classifiers and/or the like) may be used to assign an unknown telemetry report to a particular malware family, with a generic malware family representing other families, a particular benign group of applications, and/or the generic benign class representing any remaining benign applications. Note that there also may be a trained classifier for each family of malware. In another embodiment, the telemetry classifier may be a binary classifier (i.e., two classes) that is trained to predict if an unknown telemetry report was related to a malware file or a benign file on the customer machine 112.

As the telemetry reports are collected from the antimalware products, they are stored in a backend database. Some example features derived from the telemetry data and used to train the classifiers are set forth and described below. In addition, one or more other features may be used to indicate if a particular attribute is blank or null. For example, if the organization is null, a boolean feature is set to true.

| Feature | Description |
| --- | --- |
| File Name | Name of the PE file |
| Original File Name | File name in the original report |
| File Name Matches Original? | Whether the file name in this report matches the file name in the original report |
| File Type | Type of file it is |
| Signer Name | Organization that signed the file |
| Signing Authority | Certificate authority that issued the signature |
| Signature Type | File signed or not; if signed, whether the signature is legitimate or invalid |
| Description | Description of the file in the header |
| Organization | Manufacturer of the binary file |
| Version | Version number of the binary file |
| Packed | Whether the file is packed |
| LS Hash | Locality sensitive hash |
| Behavior Feature | Represents the simple behavior that caused the report to be generated |

Only two features may vary when comparing telemetry reports from a unique malware sample, namely, the file name and the behavior which caused the report to be generated (as described below). In addition to the file name associated with the telemetry report, the classifier also may consider other derived features. A separate feature identifies if the file name in the report matches the file name associated with the original report of the executable. Furthermore, the type of file (e.g. keyboard driver, printer driver, application, DLL) also may be used as a feature.

Two other features of the system may include which organization signed the file and which certificate authority granted the certificate. The certificate is verified for authenticity. The signature type feature indicates whether or not the file was signed. If it was signed, the system determines whether the signature is valid.

Another feature is the certificate authority (CA) that granted the certificate. A small percentage of malware authors have managed to obtain certificates granted from respectable certificate authorities, so as to attempt to provide assurance to users that their code is legitimate.

Executable files contain various information in the header, including the manufacturer, description, and version number. This data is transmitted to the backend in the telemetry reports and may be used as features for the classifier. More particularly, malicious files are more often packed compared to benign files, and thus whether or not a file is packed is a useful feature for the classifier/another feature in the telemetry data. In one implementation, an estimate of the entropy is used to predict whether a file is packed because packed executable files have a high entropy.

The action (i.e. suspicious behavior) that caused the report to be generated also may be used as a feature for the classifier. As part of the telemetry classifier, a unique file hash (e.g.SHA256, SHA1, MD5, etc.) is transmitted in the telemetry report, This unique file hash can be used to determine if a sample of the file under consideration has been previously collected on the backend.

In addition to an SHA1 hash, a locality sensitive hash also may be computed for the file by the antimalware client and transmitted to the backend. Unlike standard hashes which completely change when a single bit in the file is altered, locality sensitive hashes have the property that changing a small amount of code introduces only a small change in the resulting hash. Tri-grams of each file's locality sensitive hash may be used as features for the classifier. Doing so avoids the need to compare pairs of locality sensitive hash values. As a result, training and evaluation are not adversely affected as the scale increases.

The features described in the feature table can be used to classify if an individual report corresponds to a malicious file. Because the backend service observes telemetry reports from millions of clients, this telemetry data for an individual file can be aggregated for a unique file (e.g., SHA1 hash) to determine a result based multiple reports. In this case, features may include different types of observed behavior, number of observed instances of the file running on individual computers, and so forth. Some measure of the differences in the files names such as the entropy of the observed filenames also may be used as a feature.

In another implementation, the suspicious malware file (or set of files) may be transmitted to backend malware detection logic 102 running in the backend service 104 where the backend malware detection logic 102 evaluates the unknown file (or set of files). Again, the backend malware detection logic 102 includes one or more trained classifiers that determine whether the features and characteristics of the unknown file are indicative of malware or more specifically a particular family of malware. It should be noted that only the unknown suspicious file needs to be collected once the first time it is encountered on any customer machine 112. If a unique file hash is transmitted in the telemetry report, then the backend only needs to collect the unknown sample the first time the file is observed on a customer machine 112. In this case, the customer can be given the opportunity to wait for the backend service to upload and analyze the unknown file before downloading the file to the customer's machine 112.

If so, the backend malware detection logic 102 may include the results of a file based malware classifier which assigns a probability to the file that it belongs to a particular malware family, the generic malware family, a particular benign family, or the generic benign family.

In another implementation, the suspicious malware file (or set of files) may be transmitted to backend malware detection logic 102 running in the backend service 104 where the backend malware detection logic 102 evaluates the unknown file (or set of files). Again, the backend malware detection logic 102 includes one or more trained classifiers that determine whether the features and characteristics of the unknown file are indicative of malware or more specifically a particular family of malware. It should be noted that only the unknown suspicious file needs to be collected once the first time it is encountered on any customer machine 112. If a unique file hash (e.g. SHA256, SHA1, MD5, and so forth) is transmitted in the telemetry report, then the backend only needs to collect the unknown sample the first time.

As described herein, example features and characteristics for the file based classifier include file strings, antimalware engine state data, combinations of system calls and parameter values, and the like indicative of underlying behavior, such as represented as n-grams of system API calls (e.g., tri-grams composed of three consecutive system calls such as create thread, create file and writing to the registry), which typically needs to occur in malware so that the malware can accomplish its malicious purpose. Malware is often packed or encrypted. The file strings can be recovered directly from the file or extracted from memory as the unknown file unpacks or decrypts itself. In one implementation of the file classifier, a multiclass classifier (e.g. logistic regression, naïve Bayes, support vector machine, neural network, boosted decision tree, other boosted algorithms, ensemble classifiers, hierarchical classifiers) can be used to assign an unknown file to a particular malware family, the generic malware family representing all other families, a particular benign group of applications, or the generic benign class representing any remaining benign applications. Note that there also may be a trained classifier for each family of malware.

Sometimes the multi-class, telemetry or file malware family classifiers may not reach a definitive prediction for an unknown file. In this case, the classifier can return an inconclusive result. For example, assume the malware family file classifier trains one-hundred-and-two families: one-hundred malware families, a generic malware family which includes the other malware families not labeled as one of the one-hundred families, and a generic benign family. Internally in one embodiment, this classifier computes one-hundred-and-two separate "1 versus the rest" linear classifiers and computes a score for family j for the nth file, s[j,n], as:

$$s[j, n] = \sum_{f=0}^{F-1} w(f, j)x(f, n) + b(j)W(i, j)$$

where w(f,j) is the binary classifier weight for feature f for the jth family classifier. There are F total features, and x(f,n) is the fth feature value for the nth unknown file to be evaluated. Given the 102 scores (s[k,n] for k=0 to 101), the system computes the overall probability for the nth file. One possibility is to simply return the highest score, s(j,n), as the overall probability. However, this method can lead to misleading results. If all of the individual scores are large negative numbers with the addition of a small amount of noise, then the unknown file will be predicted to belong to one of the classes even though the score is very low. In this case, none of the classifiers can confidently predict that the file belongs to its class. In this case, the system does not want to force the classifier to make a decision if the output of all of the classifiers is low. Therefore, an "Inconclusive" output may be included.

To include the inconclusive state, three separate output probabilities for "Malware", "Benign", and "Inconclusive" are computed for each unknown file n. These probabilities may be given as:

$$P_{benign}(n) = e^{s[Benign,n]}/(\Sigma_k e^{s[k,n]}+1)$$

$$P_{Malware}(n) = \Sigma_{j \neq Benign} e^{s[j,n]}/(\Sigma_k e^{s[k,n]}+1)$$

$$P_{Inconclusive}(n) = 1/(\Sigma_k e^{s[k,n]}+1)$$

It is noteworthy that $$P_{Benign}(n) + P_{Malware}(n) + P_{Inconclusive}(n) = 1$$

When all of the scores for the malware classifier are low, s[j,n] is a large negative number for j≠Benign. As a result, $$P_{Benign}(n) = \frac{e^{s[Benign,n]}}{(\Sigma_k e^{s[k,n]} + 1)} \approx \frac{e^{s[Benign,n]}}{(e^{s[Benign,n]} + 1)} = \frac{1}{1 + e^{-s[Benign,n]}}$$

which is essentially equivalent to the output of the "1 versus the rest" binary classifier for the benign samples. When none of the classifiers are very confident in an output (i.e. s[j,n] is a large negative number for each j), $$P_{Inconclusive}(n) \approx 1$$

To map the results ($P_{Benign}$, $P_{Malware}$, $P_{Inconclusive}$) to the correct label string when can be stored in a database, the following may be chosen:

| Maximum Category Probability | Category Probability | First substring | Second substring |
|---|---|---|---|
| $P_{Benign}$ | >0.9 | "Benign_4" | "" |
| $P_{Benign}$ | 0.7-0.9 | "Benign_3" | (The empty string) |
| $P_{Benign}$ | 0.5-0.7 | "Benign_2" | |
| $P_{Benign}$ | 0.333-0.50 | "Benign_1" | |
| $P_{Inconclusive}$ | >0.333 | "Inconclusive" | |
| $P_{Malware}$ | 0.333-0.50 | "Malware_1" | The most likely family string (e.g. Rbot) |
| $P_{Malware}$ | 0.5-0.7 | "Malware_2" | |
| $P_{Malware}$ | 0.7-0.9 | "Malware_3" | |
| $P_{Malware}$ | >0.9 | "Malware_4" | |

The second substring in the table can then be appended to the first substring to create one string (e.g. ResultString) that can be stored in a database. The string format allows the analyst or an automated system to query for all samples which are highly likely to be any type of malware using a SQL query similar to "SELECT * FROM dbo.[tableName] WHERE ResultString LIKE 'Malware_4%'".

It should be noted that this example for computing the inconclusive output is based on training a multi-class logistic regression classifier based internally on multiple "1 versus the rest" binary classifiers. Other inconclusive results can be computed and returned for other types of classifiers including naïve Bayes, support vector machine, neural network, boosted decision tree, other boosted algorithms, ensemble classifiers, hierarchical classifiers and/or the like.

To make it more difficult for malware to evade detection, as well as for malware authors to probe the system to figure out ways to author new malware that will evade detection, various aspects of the backend classification logic/process may be rapidly updated (block 106). For example, the backend malware detection logic 102 may be updated in real time, and may be updated based upon one or more updating criteria, e.g., continuously, regularly, occasionally, randomly, based upon time and/or number of queries, and so forth. In general, the updates change the criteria by which backend malware detection logic 102 identifies malware, with the changes occurring too fast for malware authors to track.

For example, instead of using a given classifier trained for a family of malware, multiple classifiers for each family, each configured somewhat differently (e.g., using different subsets of possible signatures and/or trained with different features, weights, parameters and so forth may be available), with one (or more) classifiers randomly chosen at any given time (or per query or number of queries or the like) to look for malware. In another example, the multiple malware family classifiers can each be trained using a different subset of labeled files chosen from a larger set of files. By way of example, consider the case where the system includes 500,000 labeled examples of the Rbot malware family. Individual Rbot binary classifiers can be trained using features selected based on a fixed or randomly selected subset of 50,000 labeled Rbot files. The service as a whole can rotate through a series of distinct and different logic sets, adding to the complexity of determining the precise logic of any one set by probing, as it will be unclear which set produced a particular result. This makes classification unpredictable from the perspective of a malware author. Even retraining and/or replacing the logic once per day adds a useful amount of unpredictability to the detection process. Note that a (relatively) static classifier may be present on the frontend, with dynamically changing classifiers present on the backend.

In addition to the unpredictability that results from changing the detection logic, another attribute of the backend service logic that may be used to make reverse engineering by malware authors more difficult is the intentional introduction of noise into the logic. In general, this makes the classification determination decisions fuzzy rather than certain, making it difficult for malware authors to determine a clear line of distinction with precision. For example, if the service determines that a malware author appears to be probing the logic, the logic may (at least sometimes) override the decision and intentionally provide an inaccurate result, that is, return a lie in response to the query. Such noisy results may be randomized and/or on a percentage basis, e.g., sixty percent of likely "probing queries" may get a randomly generated result rather than the actual result returned by the classifier. The logic may also use an old classifier version when probing is suspected, so that the probing malware author spends time defeating a version that is no longer used in normal querying operations.

With respect to watching the malware system for likely probing, various mechanisms may be used. For example, if the same client (e.g., based upon an IP address) is sending files that are detected as being malware a relatively high percentage of the time, possibly with little or no relationship between the files, then the client is likely probing the system. If a client is sending the same file or family of malware with slightly different features (e.g., strings) each time, then the client is likely probing the system. Noisy classification responses (such as "no malware found," at least sometimes when it actually is detected or detectable via a current classifier) may be returned in such a situation, as described above.

Still further, when probing is suspected, the code (instead of or in addition to any features and characteristic data) that was received may be analyzed in more detail. Even if malware is not detected by current classifiers, such a post-probing analysis may allow classifiers to be updated (e.g., at a high priority) based upon what is learned from the analysis. In other words, a malware author may be revealing new malware techniques during the probing attempts, and these can be detected and proactively used to protect against what may be future malware.

Figure 2:
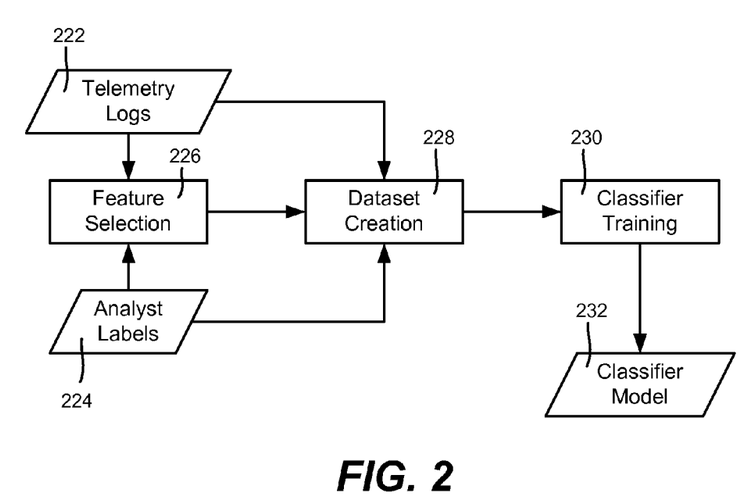
FIG. 2 is a block diagram representing an example implementation for training a classifier model based in part upon telemetry logs.

Turning to additional details of a family-based malware classification system, one example antimalware classification training system 120 (FIG. 1) is further shown in FIG. 2. Raw telemetry logs 222 (reports) and analyst labels 224 are input to the system 120, which includes various processing blocks including a feature selection component 226, a dataset creation component 228, and a classifier training component 230. As described below, the feature selection component 226 determines a subset of the total features to be used for classification.

As also described below, a labeled dataset is constructed from the analysts' labels 224 and the telemetry logs 222, and used to train a classifier model 232 using various algorithms. It should be appreciated that a preprocessing step (not shown) is usually needed to convert the raw telemetry XML data to the actual feature vector used to train the classifier. For example, the locality sensitive hash can be converted into a tri-gram representing three consecutive bytes in the hash. In another example, letters in the file name can be converted into a set of trigrams where each trigram index represents three consecutive letters in the file name. The output of the training system comprises a classifier model 232 (e.g., a set of weights or parameters), which can be used to predict if an unknown report was generated by a particular malware family, a generic malware class, a particular benign family, or a generic benign class.

Figure 3:
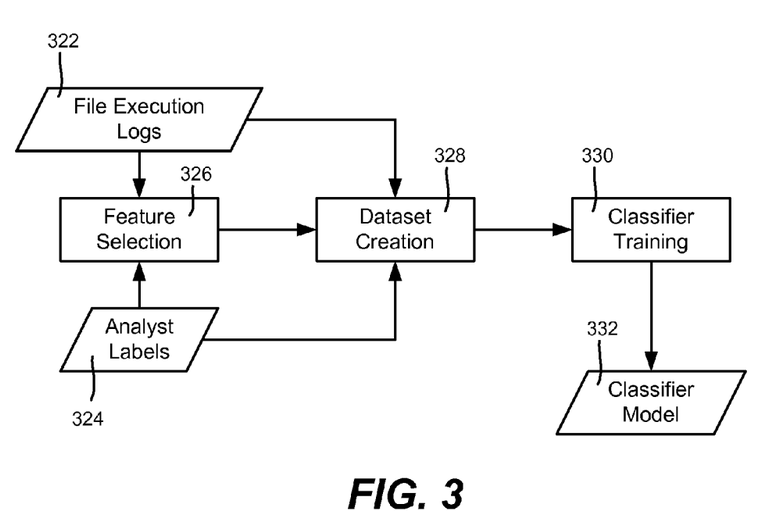
FIG. 3 is a block diagram representing an example implementation for training a classifier model based in part upon file execution logs.

Turning to additional details of a file-based malware classification system, another example antimalware classification training system 120 (FIG. 1) is further shown in FIG. 3. File execution logs 322 and analyst labels 324 are input to the system 120, which includes various processing blocks including a feature selection component 326, a dataset creation component 328, and a classifier training component 330. As described below, the feature selection component 326 also determines a subset of the total features to be used for classification.

The file execution logs 322 can be generated using several different methods either on the backend system 104 or on the client machine 112. In one alternative, the behavior on a real machine (where actions can impact the state of the machine in a way that cannot be rolled back or isolated) may be observed. In another alternative, the unknown file can be executed in a specially instrumented virtual machine which records various attributes during execution. The virtual machine can be a lightweight emulator run in the antimalware client 116 or a more in-depth system which records additional information, e.g., on the entire customer machine 112 or as a more sophisticated emulator or virtual machine running in the backend service 104. For example, the system can collect a log which records system API calls and the associated parameters. For files which are not packed or encrypted, strings in the code can be recovered directly from the executable binary. However, malware is often packed or encrypted, whereby the file strings cannot be recovered directly from the packed executable. One way to recover the file strings is to execute the packed or encrypted unknown file (e.g., in an emulation environment) and observe strings that are written to memory as they are unpacked during execution. The system can collect other types of logs which include the emulation environment or the state of the actual computer and collect these in log files. This system state information might include various data such as whether or not the file was packed, which compiler was used to compile the executable, was the firewall enabled, were threads corresponding to unknown executables running, etc. In addition to the virtual machine, the unknown file may be run on the actual system where the antimalware client 116 records the information (e.g., API calls, API parameters, strings, system state information) and writes them to log files. In this case, the full logs may be transmitted to the backend service in addition to the XML report.

As also described herein, a labeled dataset is constructed from the analysts' labels 324 and the file execution logs 322, and used to train a classifier model 332 using various algorithms. It should be appreciated that a preprocessing step (not shown) is usually needed to convert the raw data recovered by the system to the actual feature vector used to train the classifier. For example, the raw API call sequences can be converted into a set of potential feature indexes indicating the API trigram sequence. In another example, the particular combination of API call and parameter value can be converted into a second set of index values. The output of the training system comprises a classifier model 332 (e.g., a set of weights or parameters), which can be used to predict if an unknown file belongs to a particular malware family, a generic malware class, a particular benign family, or a generic benign class. The feature selection component 226 in one implementation uses system state variables, unpacked strings, API system call trigrams, and API system calls plus an individual parameter value as potential features to be ranked. Note that the features described herein are only examples, and the classifier is not limited to these types of features, as others (e.g., file geometry, file reputation and so forth) may be used instead of or in addition to some or all of the ones exemplified herein. In one example implementation, a feature selection algorithm attempts to choose the 3,000 "best" features per family, and 12,000 "best" features for the generic malware and benign families (where "best" may be determined according to an appropriate ranking metric). Note that fewer features actually result, due to overlap from one family to the next. In addition, the system can employ features for each benign family.

Thus, a ranked list of potential features for each family is computed, and used to choose the top K (3000, 12000) features for the family. These top K features are a mixture of different types of features, depending on how well they discriminate the one family from other malware and benign file classes (e.g., other malware families, generic malware family, other generic families, and generic benign family).

Next the feature selection module 326 is described in the context of the file based malware classifier. To create a dataset 328 to train the classifier model 332, the training and selection mechanism converts the raw data from log files produced by an instrumented version of an antimalware engine which runs an unknown file sample in a virtual machine into a feature vector. However, constructing a dataset from all of the raw data can lead to millions of potential features, which can cause overfitting that results from training a complex machine learning algorithm with an insufficient number of training examples. If the model is too complex, the results when the system is deployed to production may differ significantly from those observed when trained and tested on a small labeled dataset. One general rule is to select the number of features F for the system to be the total number of samples divided by a sufficiently large number (e.g. 8-10). Other mechanisms to compensate for overfitting, e.g., based on L1-regularization or the like, may be employed.

By way of example, consider the unpacked string feature, in which the training set includes a single example (e.g., file) that contains the unpacked string "XYZ", and the file is associated with a malware family Rbot. A classification algorithm may then learn to predict that any files containing string "XYZ" are likely to belong to the Rbot family. In order to choose the "best" subset of features from the large number of potential features, a feature selection algorithm is based on 2×2 contingency tables, which can be derived in a known manner.

Figure 4:
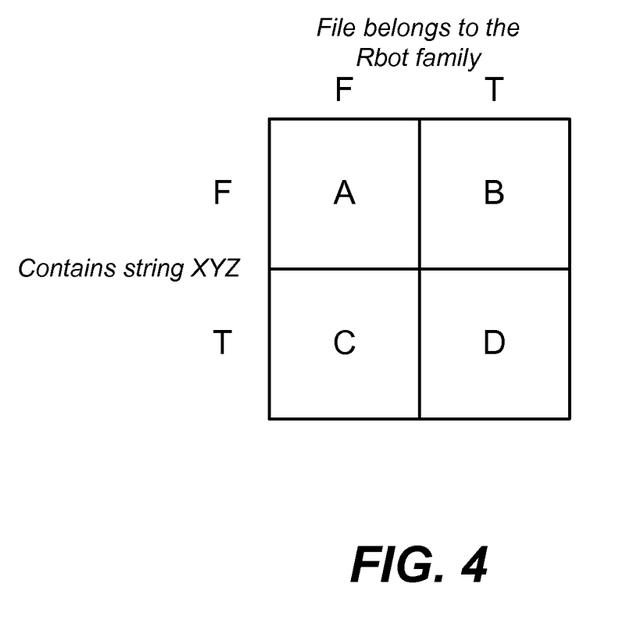
FIG. 4 is a representation of a 2×2 contingency table used by a feature selection algorithm to select features for use in malware classification.

More particularly, a 2×2 contingency table is constructed for each potential feature for each class under consideration. FIG. 4 shows the 2×2 contingency table for the potential feature for the Rbot class that the file contains the unpacked string "XYZ".

The contingency table for the potential string feature "XYZ" contains four elements, A, B, C and D. A is the count of the number of files not belonging to the Rbot family and which do not include the string "XYZ", while D is the count of the number of files of type Rbot that do include the string "XYZ". Similarly, B(C) is the number of files labeled as Rbot (not Rbot) which do not (do) contain string "XYZ". Note that only two of the counts need be computed, namely C and D. More particularly, typically, a very small number of reports are likely to have a specific string. Thus, to estimate D and C, the system counts the number of files containing the string "XYZ" corresponding to Rbot and non-Rbot files, respectively. A and B may be recovered by noting that A=NNR−C and B=NR−D where NR(NNR) is the number of Rbot (non-Rbot) files.

After the contingency table has been computed for each potential feature f a score R(f) may be evaluated according to:

$$R(f) = \log\Gamma(A+1) + \log\Gamma(B+1) + \log\Gamma(C+1) +$$
$$\log\Gamma(D+1) + \log\Gamma(A+B+C+D+4) - (\log\Gamma(A+B+2) +$$
$$\log\Gamma(C+D+2) + \log\Gamma(A+C+2) + \log\Gamma(B+D+2) + \log\Gamma(4))$$

where log Γ(x) is the log of the Gamma function of quantity x.

The set of potential features also may be ranked according to the scores for each class, and the top F features that appropriately (e.g., best) discriminate between each class (malware family, generic malware, benign family, generic benign) selected. Alternative feature selection algorithms based on other metrics such as mutual information may also be employed.

A similar feature selection process 226 for choosing the features for the telemetry classifier 232 can also be employed. In this case, the potential features correspond to the data collected in the telemetry logs 222. For example, one potential feature may represent whether the file belonged to the "Rbot" family and/or whether it was signed by certificate authority "QRS".

The ranked score R(f) provides a ranked list of potential features to use for the classifier. As part of the rapid updates 106 and noise 110, different features in the ranked list can be included in the telemetry classifier, the file based classifier, or both. For example, instead of selecting the top 300,000 features as indicated by R(f), one instance of the classifier could be trained with 300,000 features selected randomly from the top 500,000 features as determined by R(f). When the rapid update 106 is employed, a new set of 300,000 features can be randomly selected from the top 500,000. As a result, the features will be changed, ensuring that it is difficult for the attacker to determine the correct set of features.

Figure 5:
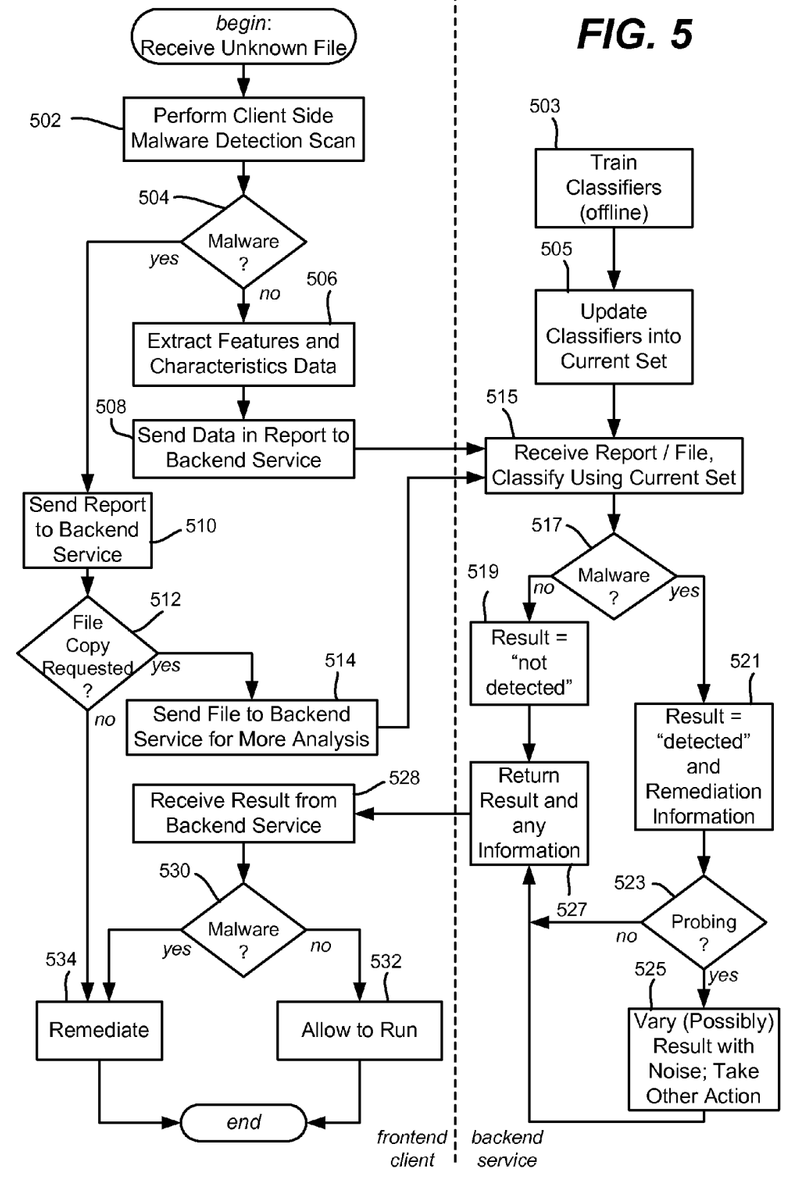
FIG. 5 is a flow diagram representing example steps for detecting malware using a client component and a backend service.

FIG. 5 is a flow diagram summarizing various aspects above via example steps, with those of the frontend client on the left of the dashed line, and those of the backend service on the right. Step 502 represents the client processing an unknown file to determine (step 504) whether the file contains malware. Note that steps 502 and 504 are optional, and for example, may not occur as all malware detection may be performed by the backend service, however for efficiency some client-side malware scanning is likely in many implementations.

If steps 502 and 504 are performed and malware is detected (or suspected), the process branches to step 510 where a report is sent to the backend service. If the backend service requests a copy of the file (step 512) then at step 514 the file is sent for more analysis, with a result returned at step 528 and followed by the client as described below. Otherwise step 512 branches to step 534 to remediate the malware problem.

If not detected at step 504, in this example a more complete scan is performed by the backend service. Although it is feasible to send the entire file, in this example step 506 is performed at the client to extract the features and any other characteristics data from the file, which is placed into a report. Step 508 sends the report in a query to the backend service.

For completeness, FIG. 5 shows training of the backend service classifiers at step 503. As described above, these classifiers are updated at step 505 into a current set, such as by training one or more different malware family (i.e. multi-class) classifiers (e.g. telemetry classifier, and/or one or more file classifiers), and using the selected classifiers as the current set against which potential malware reports are evaluated.

Step 515 represents receiving the report (or file if sent via step 514) from the frontend client at the backend service, and classifying the report as indicative of malware or not based upon the data (of file content) therein. For a telemetry report, the report data contains a unique identifier of the unknown file (e.g. SHA256 hash or SHA1 hash). Note that in-depth, file-based classification can be time consuming to evaluate an unknown file, so in order to provide a response quickly, step 515 may query another database (not shown) to determine if the file has been previously evaluated using a file-based classifier. As a result this classification can be solely on the telemetry classifier 222, one or more file classifiers 322, or a combination of classifiers. If malware is not detected, step 517 branches to step 519 where the result indicates not detected, with the query result returned at step 527.

If instead step 517 classifies the report or file as indicating malware, step 517 branches to step 521 where the result is set to indicate that malware was detected, with remediation information provided for returning in response to the query. In this example, however, before returning the response, probing-related information for this query is evaluated at step 523. If probing is determined as being likely, step 525 is performed, which represents possibly varying the result with noise in some way as described above. Step 525 also represents taking some other action, such as to request the full code rather than the feature data, where the code can be saved to a location for further for analysis. Note that steps 523 and 525 may occur elsewhere in the process, and may be optional, including when malware is not detected, however these steps are shown in this example as not being needed for the typical legitimate customer situation in which malware is not detected most of the time. Step 527 returns the result in response to the client query.

Step 528 represents the frontend client receiving the result, with step 530 evaluating the result for whether malware was detected. If not, step 532 allows the code to run, otherwise step 534 takes remedial action. A probing malware author will likely not run the code if malware is not detected, but instead learn (incorrectly) that the system has not detected the code as malware.

As can be seen, by maintaining at least some antimalware techniques in the backend where malware authors cannot directly examine them, malware authors are less able to analyze the techniques. Moreover, the backend techniques may be updated too rapidly for malware authors to track. Still further, adding noise to backend results makes it difficult for malware authors to deduce how the logic works, without making a very large number of queries. Such a large number of queries may be observed, and used to identify malware authors who are attempting to examine the backend logic, so as to take action to foil them.

Exemplary Operating Environment

Figure 6:
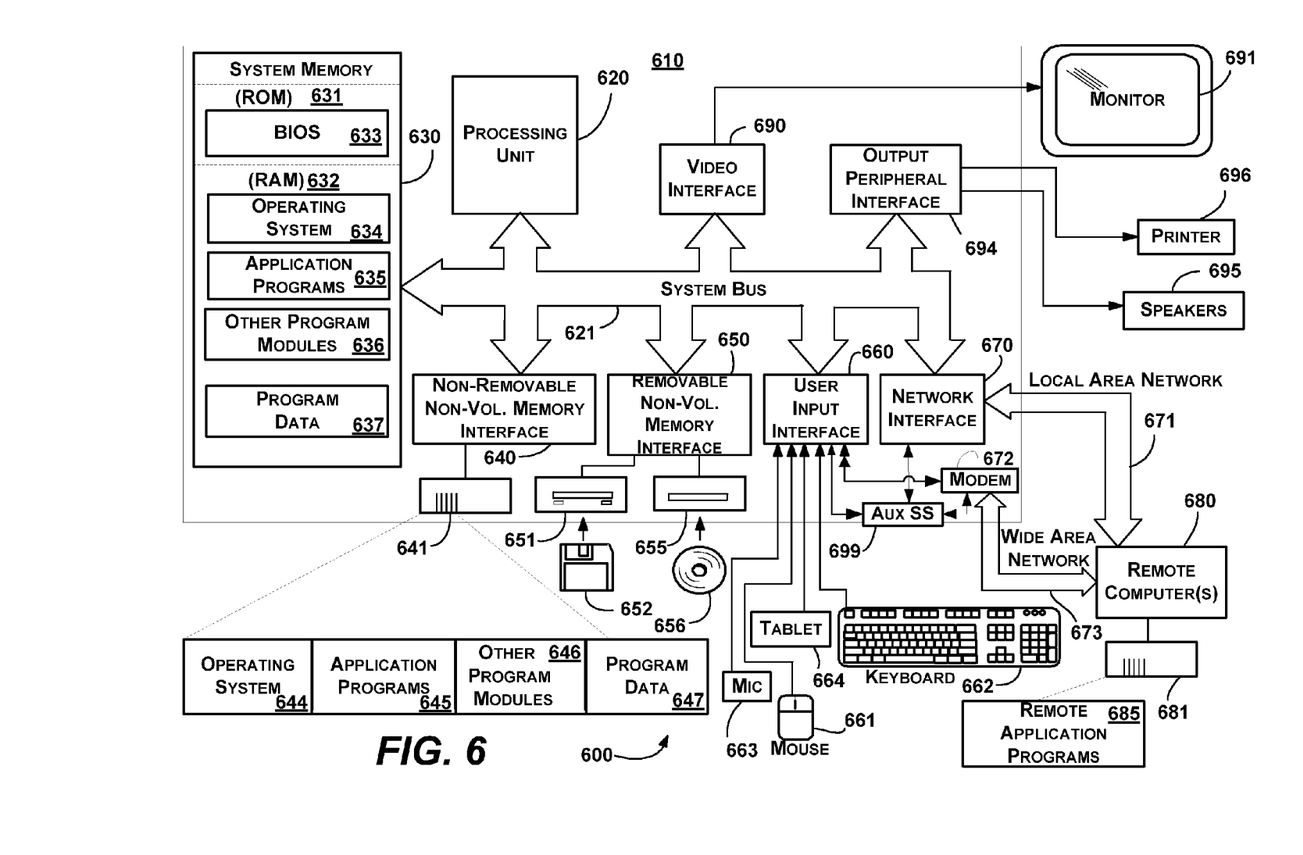
FIG. 6 is a block diagram representing an exemplary non-limiting computing system/operating environment in which one or more aspects of various embodiments described herein can be implemented.

FIG. 6 illustrates an example of a suitable computing and networking environment 600 on which the examples of FIGS. 1-5 may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, smartphones, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an exemplary system for implementing various aspects of the invention may include a general purpose computing device in the form of a computer 610. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer-readable media. Computer-readable media can be any available media that can be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636 and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 646 and program data 647. Note that these components can either be the same as or different from operating system 634, application programs 635, other program modules 636, and program data 637. Operating system 644, application programs 645, other program modules 646, and program data 647 are given different numbers herein to illustrate that, at a minimum, they are different copies. A user may enter commands and information into the computer 610 through input devices such as a tablet, or electronic digitizer, 664, a microphone 663, a keyboard 662 and pointing device 661, commonly referred to as mouse, trackball or touch pad. Other input devices not shown in FIG. 6 may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. The monitor 691 may also be integrated with a touch-screen panel or the like. Note that the monitor and/or touch screen panel can be physically coupled to a housing in which the computing device 610 is incorporated, such as in a tablet-type personal computer. In addition, computers such as the computing device 610 may also include other peripheral output devices such as speakers 695 and printer 696, which may be connected through an output peripheral interface 694 or the like.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 671 and one or more wide area networks (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660 or other appropriate mechanism. A wireless networking component such as comprising an interface and antenna may be coupled through a suitable device such as an access point or peer computer to a WAN or LAN. In a networked environment, program modules depicted relative to the computer 610, or portions thereof, may be stored in the remote memory storage device. By way of example, and not limitation, FIG. 6 illustrates remote application programs 685 as residing on memory device 681. It may be appreciated that the network connections shown are exemplary and other means of establishing a communications link between the computers may be used.

An auxiliary subsystem 699 (e.g., for auxiliary display of content) may be connected via the user interface 660 to allow data such as program content, system status and event notifications to be provided to the user, even if the main portions of the computer system are in a low power state. The auxiliary subsystem 699 may be connected to the modem 672 and/or network interface 670 to allow communication between these systems while the main processing unit 620 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method performed at least in part on at least one processor, comprising:
   receiving, by at least one processor, a malware-related query at a backend service;
   processing data corresponding to the malware-related query at the backend service, including via updateable detection logic that is not revealed outside of the backend service, to determine whether the data corresponding to the malware-related query corresponds to detected malware;
   returning a corresponding result in response to the query indicating whether the data corresponding to the malware-related query corresponds to detected malware; and providing noise that changes the result to indicate that the data corresponding to the malware-related query does not correspond to detected malware when the processing determined that the malware-related query does correspond to detected malware.

2. The method of claim 1 wherein processing the data corresponding to the malware-related query comprises determining that additional data is needed, requesting the additional data from the client, receiving the additional data from the client, and using at least some of the additional data as at least part of the data corresponding to the malware-related query that is processed to determine the corresponding result.

3. The method of claim 1 wherein the data corresponding to the malware-related query comprises feature data, and wherein processing the data corresponding to the malware-related query comprises classifying the feature data via at least one feature-based classifier.

4. The method of claim 3 further comprising, extracting the feature data at a frontend client, and sending the feature data with the malware-related query from the frontend client to the backend service.

5. The method of claim 1 further comprising, updating the updateable detection logic based upon one or more updating criteria.

6. The method of claim 1 wherein the updateable detection logic comprises a set of classifiers, and further comprising, updating the updateable detection logic by changing at least one classifier in the set.

7. The method of claim 6 wherein the classifiers are feature-based classifiers, and further comprising selecting a subset of features based upon training data and training the classifiers based upon the selected subset of features.

8. The method of claim 1, further comprising, operating the unpredictability mechanism to update the malware detection logic.

9. The method of claim 1 further comprising, determining that the query is part of a probing attempt.

10. The method of claim 9 further comprising, taking action to analyze program code from which the data corresponding to the malware-related query is obtained.

11. The method of claim 1, further comprising, varying at least one result that is returned for the query.

12. In a computing environment, a system comprising; a memory, wherein the memory includes computer-useable code, and one or more processors, wherein the one or more processors executes the computer-useable code to implement a backend service, the backend service configured with malware detection logic, the malware detection logic configured to process data corresponding to queries to determine whether for each query the data corresponding to that query is indicative of malware, the backend service further configured to respond to each query with a result indicating whether the logic determined the data to be indicative of malware, or with a request for more associated data from which the result may be determined, and the backend service further comprising an unpredictability mechanism configured to operate to keep antimalware techniques in the malware detection logic from being deduced based upon the returned result.

13. The system of claim 12 wherein the data corresponding to the query includes feature data, and wherein the malware detection logic includes at least one feature-based classifier.

14. The system of claim 12 wherein the unpredictability mechanism operates to update the malware detection logic, or to vary at least one result that is returned in response to a corresponding query, or both.

15. The system of claim 12 wherein the unpredictability mechanism operates to determine when a query is part of a probe attempt, and is configured to take action with respect to a query that is determined to be part of a probe attempt.

16. The system of claim 15 wherein the unpredictability mechanism takes action to vary the result of the query that is determined to be part of a probe attempt.

17. One or more computer storage devices having computer-executable instructions, which when executed perform steps of a process, comprising:
receiving a query and associated data at a backend service, in which the associated data is received with the query or received via one or more subsequent communications, or via a combination of both;
processing the associated data at the backend service to detect that the data corresponds to malware, and returning a response corresponding to the query including a result indicating that malware was detected;
taking an action at the backend service that is capable of providing a different result if given another query with similar associated data;
receiving another query with similar associated data at the backend service in which the similar associated data is received with the query or received via one or more subsequent communications, or via a combination of both; and
returning a response corresponding to the other query including a result indicating that malware was not detected.

18. The one or more computer storage devices computer-readable media of claim 17 wherein taking the action comprises updating malware detection logic between processing the associated data and processing the similar associated data.

19. The one or more computer storage devices computer-readable media of claim 17 wherein taking the action comprises applying a noise component that changes the result to a different result.

20. The one or more computer storage devices computer-readable media of claim 17 having further computer-executable instructions comprising, detecting that the other query is part of a probing attempt, and wherein taking the action comprises applying a noise component, based upon detecting that the other query is part of a probing attempt, which changes the result to a different result.

* * * * *